United States Patent
Ohn et al.

(10) Patent No.: US 10,023,183 B2
(45) Date of Patent: Jul. 17, 2018

(54) METHOD OF CONTROLLING ENGINE SPEED OF HYBRID VEHICLE

(71) Applicant: Hyundai Motor Company

(72) Inventors: Hyungseuk Ohn, Suwon-si (KR); Seongyeop Lim, Seoul (KR); Neungseop Oh, Seoul (KR)

(73) Assignee: Hyundai Motor Company, Seoul (KR)

( * ) Notice: Subject to any disclaimer, the term of this patent is extended or adjusted under 35 U.S.C. 154(b) by 508 days.

(21) Appl. No.: 14/546,693

(22) Filed: Nov. 18, 2014

(65) Prior Publication Data
US 2016/0082951 A1   Mar. 24, 2016

(30) Foreign Application Priority Data
Sep. 23, 2014 (KR) .......................... 10-2014-0127178

(51) Int. Cl.
*B60W 20/40* (2016.01)
*B60K 6/48* (2007.10)
(Continued)

(52) U.S. Cl.
CPC ............... *B60W 20/40* (2013.01); *B60K 6/48* (2013.01); *B60W 10/02* (2013.01); *B60W 10/06* (2013.01); *B60W 10/08* (2013.01); *B60W 10/26* (2013.01); *B60W 10/30* (2013.01); *B60W 20/00* (2013.01); *B60W 30/194* (2013.01); *F02N 11/04* (2013.01);
(Continued)

(58) Field of Classification Search
None
See application file for complete search history.

(56) References Cited

U.S. PATENT DOCUMENTS 6,617,808 B2 * 9/2003 Ito ....................... H05B 41/2923
                                                  315/246
9,151,242 B2 * 10/2015 Okamoto ................ F02D 45/00
(Continued)

FOREIGN PATENT DOCUMENTS

DE   102007005241 A1 *  8/2008  .............. F02N 11/08
DE   102007005241 A1 *  8/2008  .............. F02N 11/08
(Continued)

OTHER PUBLICATIONS

European Search Report for European Patent Application No. 14193030.5, dated Jun. 8, 2016, 11 pages.
(Continued)

*Primary Examiner* — Shelley Chen
(74) *Attorney, Agent, or Firm* — Mintz Levin Cohn Ferris Glovsky and Popeo, P.C.; Peter F. Corless

(57) ABSTRACT

A method of controlling an engine speed of a hybrid vehicle including a motor that is connected to a transmission, a battery that provides a driving voltage to the motor, an engine that is selectively connected to the motor through an engine clutch, and a hybrid starter-generator (HSG) that is connected to the engine includes: comparing, when the engine is started, an external air temperature to a setting temperature; setting a battery rated derating factor based on the comparison of the external air temperature to the setting temperature; determining an output area of the HSG according to a battery voltage; and outputting an available torque of the HSG based on the set battery rated derating factor and the determined HSG output area.

7 Claims, 5 Drawing Sheets

(51) Int. Cl.
*B60W 10/02* (2006.01)
*B60W 10/06* (2006.01)
*B60W 10/08* (2006.01)
*B60W 10/26* (2006.01)
*B60W 20/00* (2016.01)
*B60W 30/194* (2012.01)
*F02N 11/04* (2006.01)
*B60W 10/30* (2006.01)
*F02N 11/08* (2006.01)
*H02P 1/00* (2006.01)
*F02D 41/06* (2006.01)
*F02D 41/30* (2006.01)
*H02P 101/25* (2016.01)

(52) U.S. Cl.
CPC ............ *F02N 11/0862* (2013.01); *H02P 1/00* (2013.01); *B60W 2510/081* (2013.01); *B60W 2510/246* (2013.01); *B60W 2550/12* (2013.01); *B60W 2710/0644* (2013.01); *F02D 41/062* (2013.01); *F02D 41/30* (2013.01); *F02N 2200/042* (2013.01); *F02N 2200/063* (2013.01); *F02N 2200/122* (2013.01); *F02N 2300/104* (2013.01); *F02N 2300/2002* (2013.01); *H02P 2101/25* (2015.01); *Y02T 10/6286* (2013.01); *Y10S 903/93* (2013.01)

(56) References Cited

U.S. PATENT DOCUMENTS

| | | | |
|---|---|---|---|
| 9,358,968 B2* | 6/2016 | Nedorezov | B60W 10/02 |
| 2002/0109467 A1* | 8/2002 | Ito | H05B 41/2923 |
| | | | 315/291 |
| 2003/0031902 A1* | 2/2003 | Balasubramanian | H01M 8/04029 |
| | | | 429/408 |
| 2006/0001399 A1* | 1/2006 | Salasoo | B60K 6/28 |
| | | | 320/104 |
| 2009/0105043 A1* | 4/2009 | Muta | B60K 6/365 |
| | | | 477/97 |
| 2009/0125172 A1* | 5/2009 | Matsubara | B60W 10/06 |
| | | | 701/22 |
| 2009/0200095 A1* | 8/2009 | Kawasaki | B60K 6/365 |
| | | | 180/65.265 |
| 2013/0144515 A1* | 6/2013 | Okamoto | F02D 45/00 |
| | | | 701/113 |
| 2016/0023646 A1* | 1/2016 | Nedorezov | B60W 10/02 |
| | | | 701/22 |
| 2016/0032880 A1* | 2/2016 | Lovett | F02N 11/0803 |
| | | | 701/22 |
| 2016/0059803 A1* | 3/2016 | Klesyk | H02J 7/1438 |
| | | | 307/9.1 |
| 2016/0264018 A1* | 9/2016 | Choufany | H01M 10/6551 |

FOREIGN PATENT DOCUMENTS

| | | |
|---|---|---|
| EP | 1201479 A2 | 5/2002 |
| FR | 2991952 A1 | 12/2013 |
| JP | 2012-111267 A | 6/2012 |
| KR | 10-2001-0099534 A | 11/2001 |
| KR | 10-0765553 B1 | 10/2007 |
| KR | 10-0836365 B1 | 6/2008 |

OTHER PUBLICATIONS

European Search Report for European Patent Application No. 14193030.5, dated Feb. 12, 2016, 7 pages.

* cited by examiner

METHOD OF CONTROLLING ENGINE SPEED OF HYBRID VEHICLE

CROSS-REFERENCE TO RELATED APPLICATION

This application claims priority to and the benefit of Korean Patent Application No. 10-2014-0127178 filed in the Korean Intellectual Property Office on Sep. 23, 2014, the entire contents of which are incorporated herein by reference.

BACKGROUND (a) Technical Field

The present disclosure relates to a method of controlling an engine speed of a hybrid vehicle. More particularly, the present disclosure relates to a method of controlling an engine speed of a hybrid vehicle that improves fuel consumption and starting responsiveness of the hybrid vehicle by maximizing an output of a hybrid starter-generator (HSG) due to differentiating an output area of the HSG according to a battery voltage, and by minimizing a vibration due to controlling a speed of the HSG having an increased output even while raising a speed of an engine using a flywheel having reduced inertia.

(b) Description of the Related Art

A hybrid vehicle is a vehicle using two or more different kinds of power sources and is generally driven by an engine that obtains a driving torque by burning fuel and by a motor that obtains a driving torque with battery power. A hybrid vehicle may be formed according to various configurations, such as using an engine and an electric motor as a power source, while a Transmission Mounted Electric Device (TMED)-type hybrid vehicle includes a motor attached to a transmission. The TMED-type hybrid vehicle may include an engine clutch inserted between the transmission and the engine so as to implement an electric vehicle (EV) mode and a hybrid electric vehicle (HEV) mode using disconnection and connection of the engine clutch. Further, a TMED-type hybrid vehicle has an intrinsic characteristic according to each production company, and some hybrid vehicles have a hybrid starter-generator (HSG) that is connected to an engine by a belt. The HSG charges a battery by operating as a generator when starting an engine or in a state in which an engine is started.

When a hybrid vehicle having an HSG is converted from an EV mode to an HEV mode, by separating starting and driving using a driving motor and the HSG, starting responsiveness can be secured and vibration can be minimized. However, because a conventional HSG use area is selected in consideration of unfavorable conditions amidst running of a vehicle, an output of the HSG is limited. However, because a vehicle is mostly run in a general driving condition, it is necessary to variably use an HSG output torque according to an available voltage of a battery.

With respect to the engine, in order to reduce vibration and rotation vibration (e.g., by a reciprocal motion of a piston), a flywheel can be provided. The engine generates inertia by a rotation motion, and about 65-70% of inertia is caused by the flywheel. Inertia acts in an opposite direction of a moving direction, and when inertia is large, if an engine rotates, damage increases. Therefore, while a vehicle is running, in order to minimize an engine output loss due to inertia resistance, it is necessary to reduce inertia of a flywheel. However, because the flywheel reduces an engine vibration, when simply reducing inertia of the flywheel only, a driver may experience displeasure due to a vibration.

The above information disclosed in this Background section is only for enhancement of understanding of the background of the disclosure, and therefore it may contain information that does not form the related art that is already known in this country to a person of ordinary skill in the art.

SUMMARY

The present disclosure provides a method of controlling an engine speed of a hybrid vehicle having advantages of improved fuel consumption and starting responsiveness of the hybrid vehicle by maximizing an output of an HSG due to differentiating an output area of the HSG according to a battery voltage, and by minimizing a vibration due to controlling a speed of the HSG having an increased output even while raising a speed of an engine using a flywheel having reduced inertia.

Embodiments of the present disclosure provide a method of controlling an engine speed of a hybrid vehicle including a motor that is connected to a transmission, a battery that provides a driving voltage to the motor, an engine that is selectively connected to the motor through an engine clutch, and a hybrid starter-generator (HSG) that is connected to the engine including: comparing an external air temperature to a predetermined temperature when the engine is started; setting a rated derating factor of the battery based on the comparison of the external air temperature to the predetermined temperature; determining an output area of the HSG according to a battery voltage; and outputting an available torque of the HSG based on the set rated derating factor of the battery and the determined output area of the HSG.

The method may further include setting the rated derating factor of the battery as less than 1 when the external air temperature is less than the predetermined temperature, and setting the rated derating factor of the battery as 1 when the external air temperature is greater than or equal to the predetermined temperature.

The method may further include: applying a minimum output area of the HSG when the battery voltage is less than a first predetermined voltage; applying an intermediate output area of the HSG when the battery voltage is equal to or greater than the first predetermined voltage and is less than a second predetermined voltage; and applying a maximum output area of the HSG when the battery voltage is equal to or greater than the second predetermined voltage.

The method may further include: cranking the engine with the output torque of the HSG; and increasing an engine speed with only the available torque of the HSG without fuel injection until the engine speed is synchronized with a motor speed.

The method may further include generating an engine torque by coupling the engine clutch and ejecting fuel when the engine speed is synchronized with the motor speed.

The method may further include: calculating a torque for synchronizing the engine speed with the motor speed when a driving mode of the hybrid vehicle is converted from an EV mode to an HEV mode; comparing the available torque of the HSG to the torque for synchronizing the engine speed with the motor speed; and maintaining the EV mode when the available torque of the HSG is greater than the torque for synchronizing the engine speed with the motor speed.

The method may further include converting to the HEV mode when the available torque of the HSG is equal to or less than the torque for synchronizing the engine speed with the motor speed.

The converting to the HEV mode may include increasing the engine speed with the available torque of the HSG and generating the engine torque after increasing the engine speed.

Embodiments of the present disclosure further provide a method of controlling an engine speed of a hybrid vehicle including a motor that is connected to a transmission, an engine that is selectively connected to the motor through an engine clutch, and a hybrid starter-generator (HSG) that is connected to the engine including: cranking the engine with an output torque of the HSG when the engine is started; determining whether an engine speed is synchronized with a motor speed; and increasing the engine speed with only an available torque of the HSG without fuel injection when the engine speed is not synchronized with the motor speed.

The method may further include generating an engine torque by coupling the engine clutch and ejecting fuel when the engine speed is synchronized with the motor speed.

Embodiments of the present disclosure further provide a method of controlling an engine speed of a hybrid vehicle including a motor that is connected to a transmission, an engine that is selectively connected to the motor through an engine clutch, and a hybrid starter-generator (HSG) that is connected to the engine including: calculating a torque for synchronizing an engine speed with a motor speed when a driving mode of the hybrid vehicle is converted from an EV mode to an HEV mode; comparing an available torque of the HSG with the torque for synchronizing the engine speed with the motor speed; and maintaining the EV mode when the available torque of the HSG is greater than the torque for synchronizing the engine speed with the motor speed.

The method may further include converting a mode of the vehicle to the HEV mode when the available torque of the HSG is equal to or less than the torque for synchronizing the engine speed with the motor speed.

The converting to the HEV mode may include increasing the engine speed with the available torque of the HSG and generating an engine torque after increasing the engine speed.

As described above, according to embodiments of the present disclosure, by differentiating an output area of an HSG according to a battery voltage, an HSG output can be maximized, and thus, an engine operation time is reduced and starting responsiveness can be improved. Further, by changing an engine output generation time point using a flywheel having reduced inertia, a fuel injection time can be delayed, and thus, fuel consumption of the hybrid vehicle can be improved. Also, when using a flywheel having reduced inertia, a charge amount of an HSG is increased, and thus, a maximum speed and a driving time of an EV driving mode are increased, and fuel consumption of the hybrid vehicle can be improved.

Figure 1:
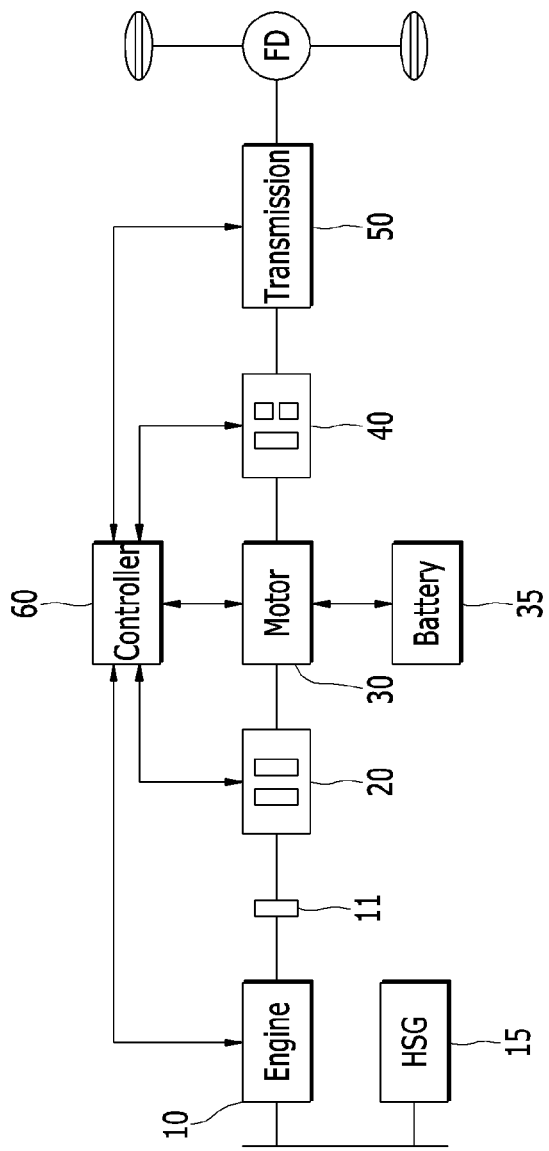
FIG. 1 is a block diagram illustrating an engine speed control apparatus of a hybrid vehicle according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment. Like reference numerals designate like elements throughout the specification.

DETAILED DESCRIPTION OF THE EMBODIMENTS

In the following detailed description, only certain embodiments of the present disclosure have been shown and described, simply by way of illustration. As those skilled in the art would realize, the described embodiments may be modified in various different ways, all without departing from the spirit or scope of the present disclosure.

In the entire specification, unless explicitly described to the contrary, the word "comprise" and variations such as "comprises" or "comprising", will be understood to imply the inclusion of stated elements but not the exclusion of any other elements. The terminology used herein is for the purpose of describing particular embodiments only and is not intended to be limiting of the disclosure. As used herein, the singular forms "a", "an" and "the" are intended to include the plural forms as well, unless the context clearly indicates otherwise. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods may be executed by at least one controller. The term "controller" may refer to a hardware device that includes a memory and a processor. The memory may be configured to store program instructions, and the processor may be configured to execute the program instructions to perform one or more processes which are described further below. Moreover, it is understood that the below methods may be executed by an apparatus comprising the controller, whereby the apparatus is known in the art to be suitable for controlling an engine speed of a hybrid vehicle.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Embodiments of the present disclosure will hereinafter be described in detail with reference to the accompanying drawings.

FIG. 1 is a block diagram illustrating an engine speed control apparatus of a hybrid vehicle according to embodiments of the present disclosure.

Referring to FIG. 1, an engine speed control apparatus of a hybrid vehicle according to embodiments of the present disclosure includes an engine 10, a flywheel 11 that is installed in a crankshaft of the engine 10, a Hybrid Starter-generator (HSG) 15, an engine clutch 20, a motor 30, a battery 35, a Dual Clutch Transmission (DCT) 40, a transmission 50, and a controller 60. As shown in FIG. 1, the engine 10 is connected to the motor 30 by the engine clutch 20, which is a first clutch, the DCT 40, which is a second clutch is connected to a shaft of the engine 10 and the motor 30, and the transmission 50 is connected to the DCT 40. In the present specification, a first clutch is the engine clutch 20, and a second clutch is the DCT 40, but the present disclosure is not limited thereto. For example, the second clutch may be implemented with an Auto Manual Transmission (AMT).

The HSG 15 for igniting fuel of a cylinder that is provided within the engine 10 is connected to the engine 10. The HSG 15 is operated by a motor to start the engine 10 or when a surplus output occurs in a state that maintains starting of the hybrid vehicle, the HSG 15 is operated as a generator to charge a battery.

In a state in which the flywheel 11 is power-connected to a crankshaft of the engine 10, when the engine 10 rotates, the flywheel 11 simultaneously rotates. In order to transfer a torque of the engine 10 to a torque of a wheel, the flywheel 11 has a friction surface in which a clutch plate contacts, and due to the frictional force, the flywheel 11 assists a smooth rotation of the engine 10. Therefore, the flywheel 11 is generally designed to have large rotational inertia.

The engine clutch 20 is disposed between the engine 10 and the motor 30 to receive an input of a control signal of the controller 60, thereby selectively connecting the engine 10 and the motor 30 according to a driving mode of the hybrid vehicle. The motor 30 operates as a motor and a generator, operates as a motor by a three phase AC voltage that is applied from an inverter (not shown) to generate a driving torque, and operates as a generator in coast down driving to recover regeneration energy, thereby charging the battery 35. The battery 35 is formed with a plurality of unit cells, and at the battery 35, a high voltage for providing a driving voltage to the motor 30 is stored. A DC high voltage that is supplied from the battery is converted to a three phase AC voltage through an inverter (not shown) to be supplied to the motor 30.

In the battery 35, a battery management device (not shown) controls a charge and discharge voltage according to a charge state to prevent the battery 35 from being discharged to a limited voltage or less or from being charged to a limited voltage or more. The battery management device transfers a charge state of the battery 35 to the controller 60 to enable a driving and regeneration generation control of the motor 30 to be executed.

In the DCT 40, a plurality of input gears are dispersedly disposed in two input shafts, and a plurality of output gears that are gear coupled to the plurality of input gears, respectively, are dispersedly disposed at two output shafts. Further, the DCT 40 includes a plurality of synchronizer mechanisms, and the plurality of synchronizer mechanisms selectively operate to connect one of a plurality of output gears and one of two output shafts. Further, the DCT 40 includes two clutches. The each clutch transfers power of a power source (e.g., an engine or a motor) to any one of two input shafts that are connected to the transmission 50. As the clutch, a so-called dry or wet clutch may be used.

In general, a hybrid vehicle drives the motor 30 using power that is charged at a battery upon initial starting, and by a driving torque that is generated in the motor 30, the DCT 40 is completely coupled to transfer power to a driving shaft. The sum of an output torque of the motor 30 and an output torque of the engine 10 that is determined according to coupling and release of the engine clutch 20 is supplied as an input torque, and a random transmission level is selected according to a vehicle speed and a driving condition and thus the transmission 50 outputs a driving torque to a driving wheel to maintain driving.

The controller 60 controls a torque of the HSG 15 and a speed of the engine 10 by outputting a control signal. The controller 60 may perform the method of controlling an engine speed of a hybrid vehicle according to embodiments of the present disclosure through a cooperation of several controllers that are provided in a typical hybrid vehicle. For example, a Hybrid Control Unit (HCU), which is a top superordinate controller, an Engine Control Unit (ECU) that controls an entire engine operation, a Motor Control Unit (MCU) that controls an entire operation of a drive motor, and a Transmission Control Unit (TCU) that controls a transmission may be used. Therefore, for convenience of description, in the present specification and claims, the various controllers that may be provided in a hybrid vehicle are referred to as the controller 60.

When starting of the engine 10 occurs, the controller 60 sets a rated derating factor of the battery 35 according to an external air temperature, determines an output area of the HSG 15 according to a voltage of the battery 35, and outputs an available torque of the HSG 15 based on the set rated derating factor of the battery and the determined the output area of the HSG 15. In this case, if an external air temperature is less than a setting temperature, the controller 60 sets the rated derating factor of the battery as less than 1, and if an external air temperature is greater than or equal to a setting temperature, the controller 60 sets the rated derating factor of the battery as 1. Further, if a voltage of the battery 35 is less than a first predetermined voltage, the controller 60 applies a minimum output area of the HSG 15, if a voltage of the battery 35 is greater than or equal to a first predetermined voltage and is less than a second predetermined voltage, the controller 60 applies an intermediate output area of the HSG 15, and if a voltage of the battery 35 is greater than or equal to a second predetermined voltage, the controller 60 applies a maximum output area of the HSG 15.

When the engine 10 is started, the controller 60 may crank the engine 10 with an output torque of the HSG 15 and increase a speed of the engine 10 with only an available torque of the HSG without fuel injection into an engine cylinder until an engine speed is synchronized with a motor speed. Thereafter, when the engine speed is synchronized with the motor speed, the controller 60 couples the engine clutch 20 and ejects fuel into the engine cylinder, thereby generating an engine torque.

When a driving mode of the hybrid vehicle is converted from an EV mode to an HEV mode, the controller 60 calculates a torque for synchronizing an engine speed with a motor speed and compares a torque for synchronizing the engine speed to the motor speed and an available torque of the HSG, thereby determining whether to convert to an HEV mode. In this case, if the available torque of the HSG is greater than the torque for synchronizing the engine speed with the motor speed, the controller 60 maintains the driving mode of the hybrid vehicle to the EV mode, and if the available torque of the HSG is equal to or less than a torque for synchronizing the engine speed with a motor speed, the controller 60 may convert the driving mode of the hybrid vehicle to the HEV mode.

Here, after increasing an engine speed with the available torque of the HSG, the controller 60 may convert the mode of the hybrid vehicle to the HEV mode by ejecting fuel into the engine cylinder and generating an engine torque. To this end, the controller 60 may be implemented with at least one microprocessor operating by a predetermined program, and the predetermined program may be programmed to perform each step of the method of controlling an engine speed of a hybrid vehicle according to embodiments of the present disclosure.

Figure 2:
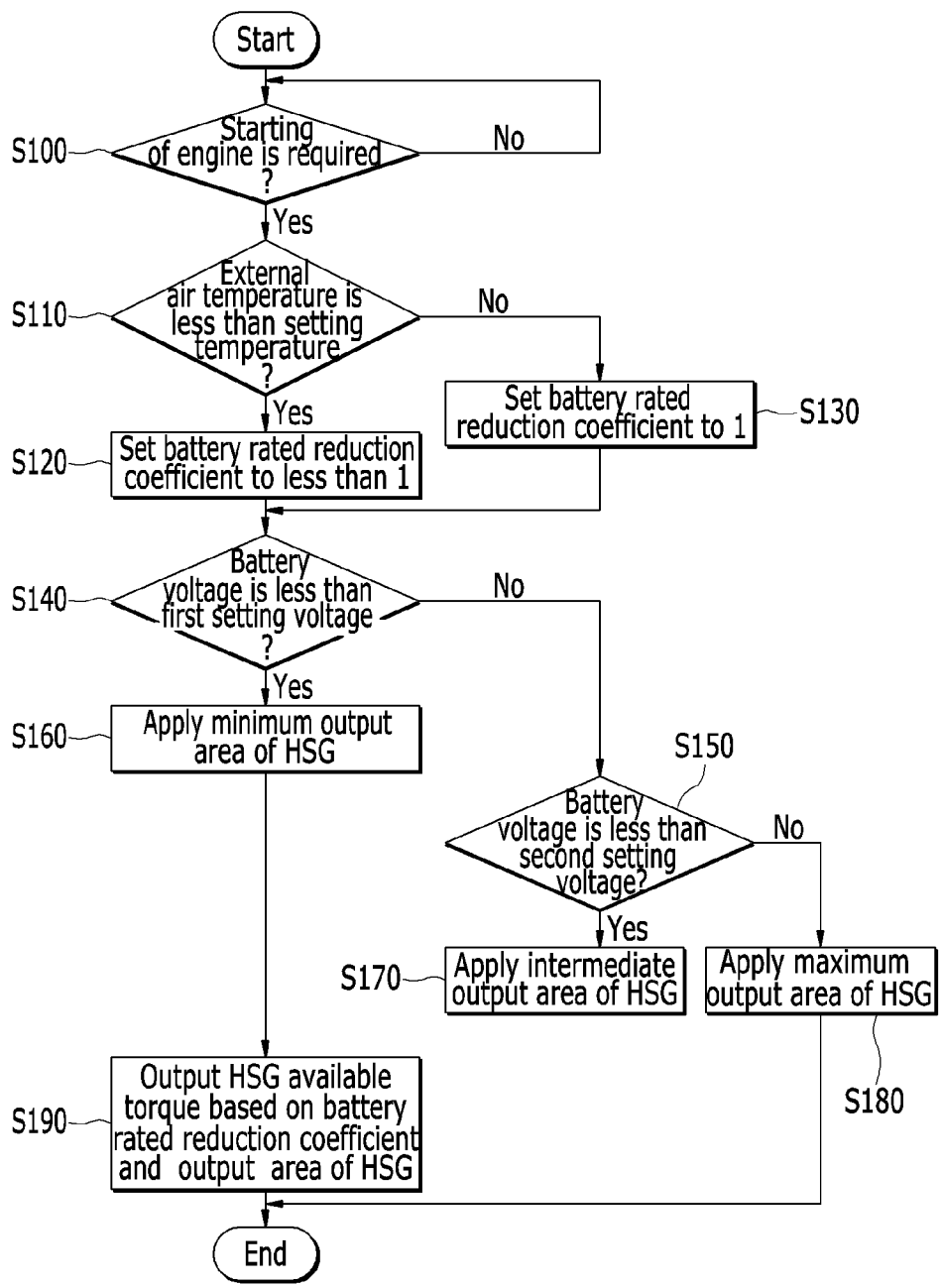
FIG. 2 is a flowchart illustrating a method of controlling an engine speed of a hybrid vehicle according to embodiments of the present disclosure.

FIG. 2 is a flowchart illustrating a method of controlling an engine speed of a hybrid vehicle according to embodiments of the present disclosure.

As shown in FIG. 2, a method of controlling an engine speed of a hybrid vehicle according to embodiments of the present disclosure is started when the controller 60 determines whether starting of the engine 10 is required (S100). If the engine 10 is started, the controller 60 compares an external air temperature and a predetermined temperature (S110). If the external air temperature is less than the predetermined temperature, the controller 60 sets a rated derating factor of the battery as less than 1 (S120). If the external air temperature is equal to or greater than the predetermined temperature, the controller 60 sets the rated derating factor of the battery to 1 (S130).

When the rated derating factor of the battery is set at step S120 or S130, the controller 60 determines an output area of the HSG according to a voltage of the battery 35. That is, the controller 60 compares a voltage of the battery 35 to a first predetermined voltage (S140), and if the voltage of the battery 35 is less than the first predetermined voltage, the controller 60 applies a minimum output area of the HSG 15 (S160).

If a voltage of the battery 35 is equal to or greater than the first predetermined voltage, the controller 60 compares the voltage of the battery 35 with a second predetermined voltage (S150). If the voltage of the battery 35 is equal to or greater than the first predetermined voltage and is less than the second predetermined voltage, the controller 60 applies an intermediate output area of the HSG 15 (S170). If the voltage of the battery 35 is equal to or greater than the second predetermined voltage, the controller 60 applies a maximum output area of the HSG 15 (S180). Thereafter, the controller 60 outputs an available torque of the HSG based on the rated derating factor of the battery that is set at step S120 or S130 and an output area of the HSG 15 that is applied at step S160 to S180 (S190).

Figure 5:
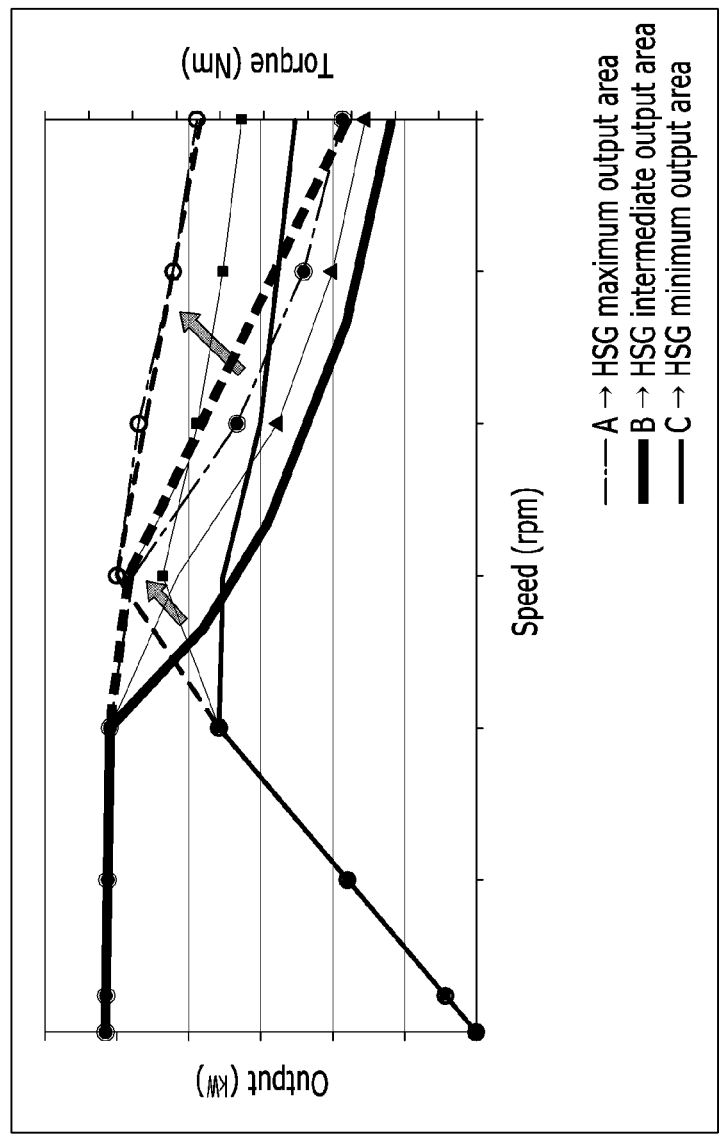
FIG. 5 is a graph illustrating an increased available torque of the HSG when applying to a hybrid vehicle according to embodiments of the present disclosure.

FIG. 5 is a graph illustrating an increased available torque of the HSG when applying to a hybrid vehicle according to embodiments of the present disclosure.

In FIG. 5, the available torque of a conventional HSG and the available torque of a HSG according to embodiments of the present disclosure according to a HSG speed are shown.

When the HSG speed exceeds a predetermined speed (e.g., 4000 rpm), the available torque of the conventional HSG starts to decrease. Particularly, when a maximum output area or an intermediate output area of the HSG is applied, the available torque of the HSG more sharply reduces.

However, according to embodiments of the present disclosure, even when the intermediate output area of the HSG is applied, the available torque of the HSG increases as indicated by an arrow, and when the minimum output area of the HSG is applied, the available torque of the HSG much more increases. In this way, according to embodiments of the present disclosure, by differentiating the output area of the HSG according to the battery voltage, an HSG output can be maximized and thus an engine operation time is reduced and starting responsiveness can be improved.

Figure 3:
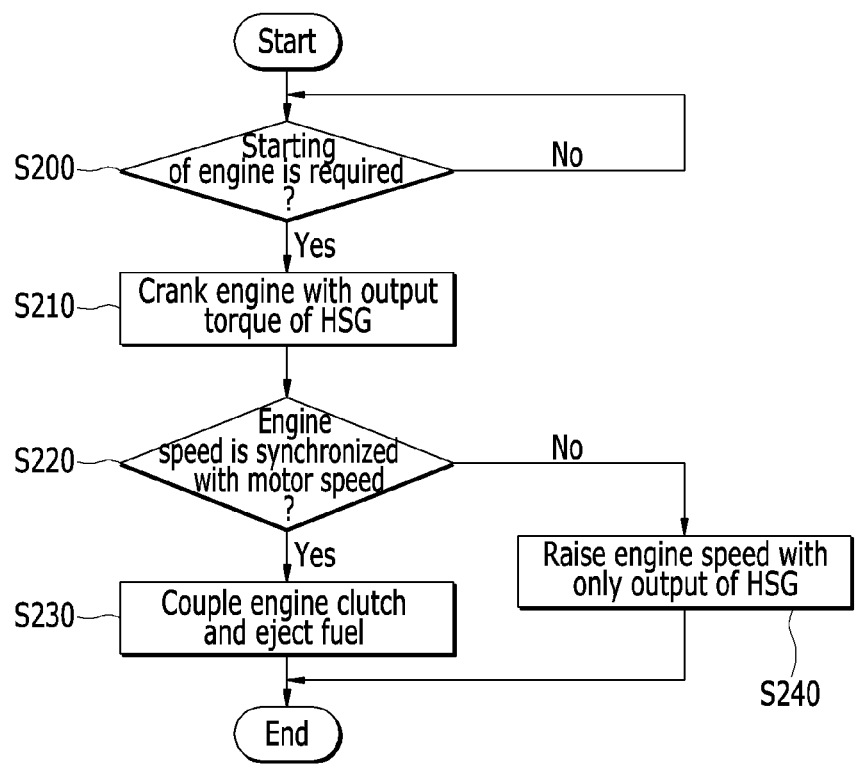
FIG. 3 is a flowchart illustrating a method of controlling an engine speed of a hybrid vehicle according to embodiments of the present disclosure.

FIG. 3 is a flowchart illustrating a method of controlling an engine speed of a hybrid vehicle according to embodiments of the present disclosure.

As shown in FIG. 3, a method of controlling an engine speed of a hybrid vehicle according to embodiments of the present disclosure is started when the controller 60 determines whether starting of the engine 10 is required (S200). If starting of the engine 10 is required, the controller 60 cranks the engine 10 with an output torque of the HSG 15 (S210). In this case, when the flywheel 11 having reduced inertia is mounted so that the engine speed is synchronized with the motor speed with only the output torque of the HSG, cranking rpm of the engine 10 may be increased (e.g., 3000 rpm or more) with only an output torque of the HSG 15.

Thereafter, the controller 60 determines whether an engine speed is synchronized with a motor speed (S220). If the engine speed is not synchronized with the motor speed, the controller 60 increases the engine speed with only the output torque of the HSG 15 (S240). That is, the controller 60 may increase the engine speed not to eject fuel into an engine cylinder and to synchronize the engine speed with the motor speed.

As the engine speed increases, if the engine speed is synchronized with the motor speed at step S220, the controller 60 couples the engine clutch 20 and controls to eject fuel to the engine 10 (S230). As described above, by maximizing an available output of the HSG 15 and by mounting the flywheel 11 having reduced inertia, a speed of an engine increases and thus a fuel injection time point can be delayed. Therefore, fuel consumption of the hybrid vehicle can be improved.

Figure 4:
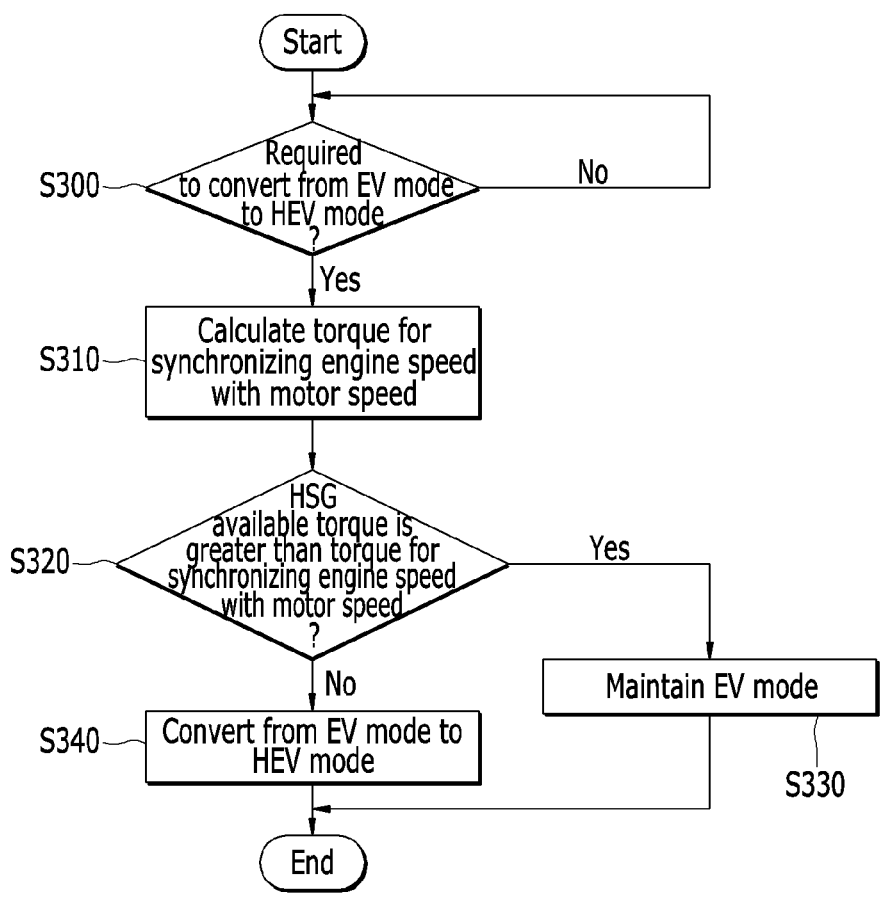
FIG. 4 is a flowchart illustrating a method of controlling an engine speed of a hybrid vehicle according to embodiments of the present disclosure.

FIG. 4 is a flowchart illustrating a method of controlling an engine speed of a hybrid vehicle according to embodiments of the present disclosure.

As shown in FIG. 4, a method of controlling an engine speed of a hybrid vehicle according to embodiments of the present disclosure is started when the controller 60 determines whether a driving mode of the hybrid vehicle is/will be converted from an EV mode to an HEV mode (S300). If the driving mode of the hybrid vehicle is/will be converted from the EV mode to the HEV mode, the controller 60 calculates a torque for synchronizing an engine speed with a motor speed (S310).

When the torque for synchronizing the engine speed with the motor speed is calculated, the controller 60 compares an available torque of the HSG with the torque for synchronizing the engine speed with the motor speed (S320). If the available torque of the HSG is greater than the torque for synchronizing the engine speed with the motor speed, the controller 60 maintains the driving mode of the hybrid vehicle to the EV mode (S330).

When the flywheel 11 having reduced inertia is mounted so that the engine speed is synchronized with the motor speed with only an HSG output torque, the controller 60 may increase a maximum vehicle speed of the EV mode with an output of the HSG 15. If the available torque of the HSG is equal to or less than the torque for synchronizing the engine speed with the motor speed at step S320, the controller 60 converts the driving mode of the hybrid vehicle from the EV mode to the HEV mode (S340). In this case, the controller 60 may increase the engine speed with the available torque of the HSG, generate an engine torque by ejecting fuel, and convert the mode of the hybrid vehicle to the HEV mode.

As described above, according to embodiments of the present disclosure, by maximizing the available output of the HSG 15 and by mounting the flywheel 11 having reduced inertia, the EV mode in which the maximum vehicle speed is increased can be maintained for a long period of time, and thus, fuel consumption of the hybrid vehicle can be improved.

While the contents of the present disclosure have been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A method of controlling an engine speed of a hybrid vehicle including a motor that is connected to a transmission, a battery that provides a driving voltage to the motor, an engine that is selectively connected to the motor through an engine clutch, and a hybrid starter-generator (HSG) that is connected to the engine, the method comprising:
   comparing an external air temperature to a predetermined temperature when the engine is started;
   setting a rated derating factor of the battery based on the comparison of the external air temperature to the predetermined temperature;
   determining an output area of the HSG according to a battery voltage;
   outputting an available torque of the HSG based on the set rated derating factor of the battery and the determined output area of the HSG; and
   setting the rated derating factor of the battery as less than 1 when the external air temperature is less than the predetermined temperature, and setting the rated derating factor of the battery as 1 when the external air temperature is greater than or equal to the predetermined temperature.

2. The method of claim 1, further comprising:
   applying a minimum output area of the HSG when the battery voltage is less than a first predetermined voltage;
   applying an intermediate output area of the HSG when the battery voltage is equal to or greater than the first predetermined voltage and is less than a second predetermined voltage; and
   applying a maximum output area of the HSG when the battery voltage is equal to or greater than the second predetermined voltage.

3. The method of claim 1, further comprising:
   cranking the engine with the output torque of the HSG; and
   increasing an engine speed with only the available torque of the HSG without fuel injection until the engine speed is synchronized with a motor speed.

4. The method of claim 3, further comprising generating an engine torque by coupling the engine clutch and ejecting fuel when the engine speed is synchronized with the motor speed.

5. The method of claim 1, further comprising:
   calculating a torque for synchronizing the engine speed with the motor speed when a driving mode of the hybrid vehicle is converted from an electric vehicle (EV) mode to hybrid electric vehicle (HEV) mode;
   comparing the available torque of the HSG to the torque for synchronizing the engine speed with the motor speed; and
   maintaining the EV mode when the available torque of the HSG is greater than the torque for synchronizing the engine speed with the motor speed.

6. The method of claim 5, further comprising converting to the HEV mode when the available torque of the HSG is equal to or less than the torque for synchronizing the engine speed with the motor speed.

7. The method of claim 6, wherein the converting to the HEV mode comprises increasing the engine speed with the available torque of the HSG and generating the engine torque after increasing the engine speed.

* * * * *